(12) United States Patent
Benkert et al.

(10) Patent No.: US 6,796,497 B2
(45) Date of Patent: Sep. 28, 2004

(54) SYSTEM AND METHOD FOR FACILITATING A SUBSIDIARY CARD ACCOUNT

(75) Inventors: Marc Benkert, Phoenix, AZ (US); Grace Park, New York, NY (US); Tomer Rubinshtein, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 32 days.

(21) Appl. No.: 10/128,949

(22) Filed: Apr. 23, 2002

(65) Prior Publication Data

US 2003/0197058 A1 Oct. 23, 2003

(51) Int. Cl.[7] .................................................. G06K 5/00
(52) U.S. Cl. ...................................... 235/380; 235/379
(58) Field of Search .............................. 235/379, 380; 705/44

(56) References Cited

U.S. PATENT DOCUMENTS

| | | |
|---|---|---|
| 4,837,422 A | 6/1989 | Dethloff et al. |
| 5,025,372 A | 6/1991 | Burton et al. |
| 5,046,157 A | 9/1991 | Smith et al. |
| 5,287,269 A | 2/1994 | Dorrough et al. |
| 5,321,241 A | 6/1994 | Craine |
| 5,350,906 A | 9/1994 | Brody et al. |
| 5,500,513 A | 3/1996 | Langhans et al. |
| 5,621,201 A | 4/1997 | Langhans et al. |
| 5,708,422 A | 1/1998 | Blonder et al. |
| 5,845,260 A | 12/1998 | Nakano et al. |
| 5,864,830 A | 1/1999 | Armetta et al. |
| 5,878,134 A | 3/1999 | Handelman et al. |
| 5,903,830 A | 5/1999 | Joao et al. |
| 5,907,831 A * | 5/1999 | Lotvin et al. .................. 705/14 |
| 5,914,472 A | 6/1999 | Foladare et al. |
| 5,953,710 A | 9/1999 | Fleming |
| 5,991,750 A | 11/1999 | Watson |
| 5,999,596 A | 12/1999 | Walker et al. |
| 6,021,943 A | 2/2000 | Chastain |
| 6,023,682 A | 2/2000 | Checchio |
| 6,032,134 A | 2/2000 | Weissman |
| 6,044,360 A | 3/2000 | Picciallo |
| 6,052,675 A | 4/2000 | Checchio |
| 6,064,986 A | 5/2000 | Edelman |
| 6,128,602 A | 10/2000 | Northington et al. |
| 6,173,269 B1 | 1/2001 | Solokl et al. |
| 6,182,895 B1 | 2/2001 | Albrecht |
| 6,185,545 B1 | 2/2001 | Resnick et al. |
| 6,226,624 B1 | 5/2001 | Watson et al. |
| 6,267,292 B1 | 7/2001 | Walker et al. |

\* cited by examiner

*Primary Examiner*—Thien M. Le
*Assistant Examiner*—Lisa M Caputo
(74) *Attorney, Agent, or Firm*—Snell & Wilmer, L.L.P.

(57) ABSTRACT

The present invention provides a system and method for providing a flexible limit subsidiary card account. In particular, the present provides a system and method for allowing a parent to provide funds to a subsidiary and to control the spending of subsidiary or spending capacity. The card account may be issued at the request of the parent who may retain the ability to define, modify, and/or terminate the spending and/or debt accumulation limits for the subsidiary card account as well as other features as described in the attached disclosure.

32 Claims, 3 Drawing Sheets

SYSTEM AND METHOD FOR FACILITATING A SUBSIDIARY CARD ACCOUNT

FIELD OF INVENTION

The present invention relates generally to systems for facilitating transactions, and more specifically to systems for facilitating financial services at the request of a first party for the use of a second party such that the first party may define, modify, and/or terminate the spending capacity accorded the second party.

BACKGROUND OF INVENTION

Many financial institutions are providing plastic stored-value cards (e.g. debit cards, telephone calling cards, loyalty cards, etc.) that can be used in lieu of cash. To enable a stored value card, a user transfers an amount of value to the issuing institution, which stores or credits a corresponding amount of value to the user's account, allowing the value to be spent by the card user. The value may be transferred to the issuing institution in a variety of ways such as on-line transfers from bank accounts or credit cards. The stored value cards then can be used to pay for items in stores or on-line, and to withdraw cash at automated teller machines (ATMs). The stored value cards appear to function like credit cards, but they often extend little or no credit to the user, so the cards do not substantially enable users to finance their transactions.

Some people or entities may be unable, or may not desire, to acquire traditional credit cards (e.g., teenagers, college students, employees, financially insecure or dependent consumers, or others lacking sufficient credit history, permanent income, or age). These parties, however, often desire the alternative of stored value cards for the convenience and prestige they provide. Those who are responsible for such consumers (e.g., parents, guardians, employers, and the like) often desire stored value cards because they provide a convenient mechanism for disbursing financial support to their employees and/or dependents. For example, stored value cards often enable parents to add value to the cards on-line, remote from a dependant who may be away at college, traveling abroad, or residing with a different guardian. Similarly, companies may desire to use stored value cards to enable employees to make expenditures for travel, supplies, or other business related expenses or may even use such financial vehicles for payment of wages, salary, or bonuses. To many parents, stored value cards also provide a useful teaching aid through which dependants may practice skills such as budgeting, saving, disciplined spending and/or management of credit.

In addition, parents often desire to provide security for their children to prepare for contingencies that may arise such as a need for emergency medical care. At the same time, however, those parents may not wish that their children have general access to funds for non-emergencies. Unfortunately, however, many existing credit cards do not provide a convenient mechanism for permitting a user access to a limited set of goods or services or providers of same while limiting their access to other goods or services.

Stored value cards also provide parents the ability to track and control the spending and/or accumulation of debt by their dependants. For example, some stored value cards provide parents with access to on-line databases that allow review of information about how much and where their dependents spent the value stored on their cards. Dependants also often appreciate the tracking capability because it provides a convenient record not readily available with purely cash transactions.

Some cards are available that enable parents to prevent the cards from being used by the dependent to purchase goods and/or services from specific merchants or classes of merchants (e.g., those who sell pornography, tobacco and alcohol, or other forbidden goods or services). For example, AMERICAN EXPRESS™' Cobalt card enables the blocking of purchases from on-line retailers that sell pornography, tobacco and alcohol. Similarly, U.S. Pat. No. 6,173,269 discloses a method and apparatus for executing electronic commercial transactions with minors where such transactions are limited only to those vendors that have been approved by the minor's parents. Moreover, M2Card highlights "questionable" transactions on account summaries. Other stored value cards, such as "VISA™ Buxx," provide convenience features such as the ability to accept and accumulate gifts in the form of value to be spent at particular merchants. For purchases above the amount of the gift, additional value may be deducted from the stored value card. Other examples of currently available stored value cards include MASTERCARD™Electronic Card (India, Malaysia), MASTERCARD™ Generation X (Brazil), VISA™ (Brazil), NOVACASH™ (Argentina), and AAA™ Everyday Funds. Unfortunately, stored value cards often require payment of funds prior to or contemporaneously with addition of value to the cards. Thus, once the funds have been credited to the dependant's account, the cards provide parents with only limited control over the spending capacity and debt accumulation by the dependant.

Other attempts to satisfy the above-described needs without requiring prepayment and storage of value on the cards of the dependants involve the issuance of subsidiary cards that are linked to, and are able to access, the credit lines of the master accounts. For example, U.S. Pat. No. 4,837,422 describes a multi-user card system in which a card combination that is issued to a single cardholder can be re-programmed by the cardholder for use by a sub-user to a desired extent with regard to value and time. Similarly, U.S. Pat. No. 5,864,830 discloses a data processing method of configuring and monitoring a satellite spending card linked to a host credit card such that a predetermined available spending capacity of each satellite card is selectively determined by the holder of the parent card Moreover, U.S. Pat. No. 5,294,472 describes a credit card spending authorization control system in which allowing a parent to control the use of an ancillary credit or debit card, which is issued to a subsidiary. Further, U.S. Pat. No. 5,953,710 shows a subsidiary's credit or debit card system that includes a subsidiary's credit card account linked to a parent's credit or debit card account. The systems disclosed in the foregoing patents have typically experienced limited success because parents may not wish to provide their dependents with access to the parents' credit line. Moreover, a sufficient mechanism does not exist that would enable a parent to provide credit to a subsidiary, such as a child, while retaining the ability to control the spending capacity and debt accumulation by the subsidiary.

Accordingly, it would be advantageous to have a system and method for providing a flexible limit subsidiary card that does not require the prepayment and/or storage of value prior to use to facilitate transactions. It would also be advantageous to have a financial vehicle that would enable a parent to provide value to be spent by a subsidiary, while providing control over the spending capacity and/or debt accumulation by the subsidiary. It would further be advantageous if such control included the ability to limit total spending or to prevent or limit spending for specific classes of goods and/or services or to limit or prevent spending at specific classes of merchants or service providers or to limit or prevent spending at specifically identified merchants or service providers. It would also be advantageous to have a system and method for providing a flexible limit subsidiary card that would provide additional features such as replacement in the event the card is lost or stolen, wherein such a feature is are not typically available with cash. It would also be advantageous to have a system and method for providing a flexible limit subsidiary card that would provide the user with freedom and independence to use the received funds to facilitate on-line and off-line transactions as well as withdrawals of money from ATMs. It would also be advantageous to have a system and method whereby a parent could provide security for emergency situations such as medical care while limiting access to credit in other situations. Finally, it would be advantageous for such a card to enable carry-over of a credit balance.

SUMMARY OF THE INVENTION

The present invention is directed toward a flexible limit subsidiary card account. In particular, the invention is directed toward a system and method that allows a parent to provide funds to a subsidiary and to at least partially control the subsidiary's spending capacity. The system for administering a subsidiary card account includes a parent and an administrator. The parent, which is responsible for a related credit instrument, e.g., a parent account, is configured to communicate a request for a credit card account to be issued to a subsidiary. The administrator is configured to receive the request from the parent and to facilitate the establishment and issuance of the subsidiary card account. The administrator is also configured to facilitate determination and adjustment of appropriate spending power for the parent account and spending capacity for the subsidiary card account in accordance with a predetermined set of rules. An exemplary set of rules may require an allocation of risk between the administrator and the parent whereby the spending power of the parent account is reduced by an amount that is less than the credit line established for the related subsidiary card account, in accordance with an allocation of risk to the administrator. In addition, an exemplary administrator is further configured to receive and facilitate execution of a request from the parent to define, modify, and/or terminate the spending and/or debt accumulation limits, i.e., capacities, for the subsidiary card account.

BRIEF DESCRIPTION OF EXEMPLARY DRAWINGS

The above-mentioned objects and features of the present invention can be more clearly understood from the following detailed description considered in conjunction with the following drawings, in which like numerals represent like elements and in which.

DETAILED DESCRIPTION OF EXEMPLARY EMBODIMENTS

Figure 1:
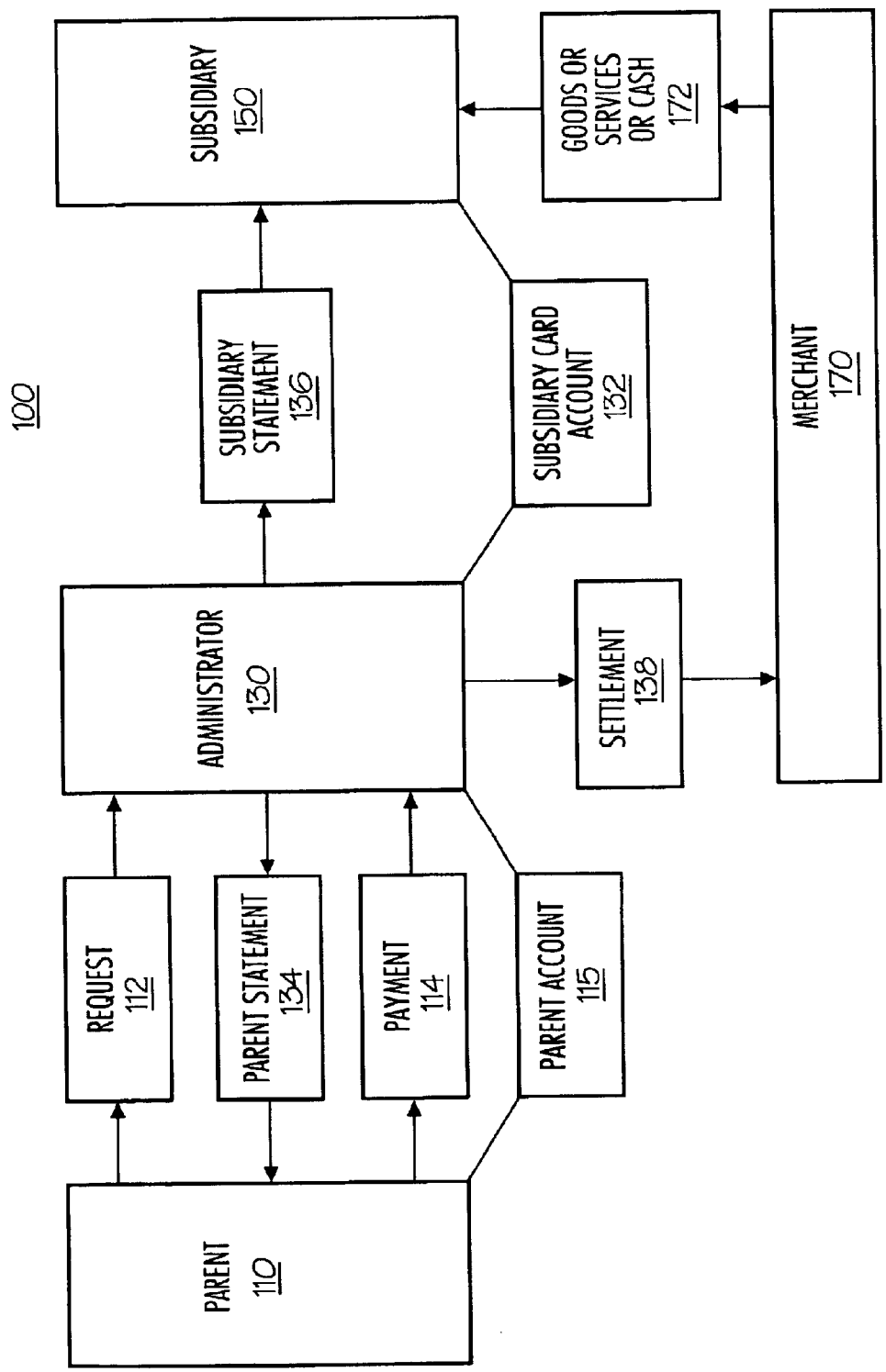
FIG. 1 illustrates the interactions of an exemplary system configured to administer a flexible limit subsidiary card account.

The present invention is a payment and funding vehicle that is configured to allow a parent and an administrator to provide funds in the form of a credit line to a subsidiary. The system thereby facilitates control over the subsidiary's spending capacity and/or debt accumulation. In accordance with one aspect of the invention, a system for administering a subsidiary card account includes a parent and an administrator. The parent, which is responsible for a related credit instrument, e.g., a parent account, is configured to communicate a request to the administrator requesting that a credit card account be issued to a subsidiary. The administrator is configured to receive the request from the parent and to facilitate the establishment and administration of the subsidiary card account so that it may be used by the subsidiary to facilitate transactions. The administrator is also configured to facilitate determination and adjustment of appropriate spending power for the parent account and spending capacity for the subsidiary card account in accordance with a predetermined set of rules. An exemplary set of rules may require an allocation of risk between the administrator and the parent whereby the spending power of the parent account is reduced by an amount that is less than the credit line, ie., spending capacity, established for the related subsidiary card account, in accordance with, and reflecting, an allocation of risk to the administrator. In addition, an exemplary administrator is further configured to receive, and facilitate execution of, a request from the parent to define, modify, and/or terminate the spending capacity and/or debt accumulation limits for the subsidiary card account.

In accordance with a further aspect of the present invention, a method of administering a subsidiary card account at the request of a parent is also provided. In accordance with the invention, a parent communicates a request to an administrator to issue a subsidiary card account to a subsidiary. The administrator receives the request and approves or denies it based on a predetermined set of rules. If the request is approved, the administrator establishes the spending capacity of the subsidiary card account, modifies the spending power of the parent account, and allocates the difference to the administrator as additional risk. The administrator dispatches the subsidiary card, or other tangible indicia of the subsidiary card account, to the subsidiary who may then use the subsidiary card account to facilitate transactions. The administrator additionally facilitates performance of various administrative functions that enable the subsidiary card account to function as a credit vehicle with a degree of control afforded to the parent to define, modify, and/or terminate the spending capacity and/or debt accumulation limits for the subsidiary card account.

As used herein, the term "parent" refers to a party possessing an existing credit vehicle, such as a credit card account, and desiring to establish, and at least partially accept responsibility for, a credit line to be used by another party. It should be noted that the parent may be a guardian, company, entity, software, hardware or any other party which provides credit for a subsidiary. Also, as used herein, the term "subsidiary" refers to the recipient of the credit line. It should be noted that a subsidiary may be any person, entity, software, hardware or other party capable of receiving and using a credit line provided by a parent and may be a dependant child, an employee, or any other party capable of receiving a credit line.

In accordance with the present invention, the account held by the subsidiary (e.g., the subsidiary card account) facilitates transactions by allowing the subsidiary to access credit. It should be noted that the subsidiary card account is substantially a credit vehicle. As such, it does not require substantial pre-payment, neither by the parent nor the subsidiary. Moreover, the parent or subsidiary card account may include an account code associated with a physical card or simply an account code without a physical card.

It should be noted that, as used herein, the term "administrator" refers to all types of credit issuing institutions, such as banks, credit card companies, card sponsoring companies, or third party issuers under contract with financial institutions. It is further noted that other participants may be involved in some phases of the transaction, such as an intermediary settlement institution, but these participants are not shown.

An "account number", as used herein, includes any device, code, or other identifier/indicia suitably configured to allow the consumer to interact or communicate with the system, such as, for example, authorization/access code, personal identification number (PIN), Internet code, other identification code, and/or the like which is optionally located on a rewards or incentives card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data from itself to a second device. A subsidiary or parent account number may be, for example, a sixteen-digit credit issuer's identifier such as a credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the consumer.

Although described in terms of a card account, the invention may represent a complete payment service encompassing all involved processes from authentication of the participants to authorization of the transaction to settlement of the payment. The flexible limit subsidiary card account may be established as virtual account, but can also be offered and distributed as a plastic card to be managed and/or supported by an issuer, and can further be branded for and distributed by a third party. It should be noted that the flexible limit subsidiary card account may be used to facilitate online transactions as well as transactions conducted at storefronts using plastic that has been distributed for the flexible limit subsidiary card account.

FIG. 1 illustrates the interactions of an exemplary system configured to administer a flexible limit subsidiary card account. In accordance with an exemplary embodiment, the system 100 facilitates interaction between a parent 110, a subsidiary 150 and a merchant 170 through an administrator 130. Parent 110 is responsible for a parent account 115, and is configured to communicate a request 112 to administrator 130 requesting that a subsidiary card account 132 be established for subsidiary 150. Administrator 130 is configured to receive request 112 from parent 110 and to facilitate the establishment and administration of a subsidiary card account 132 so that it may be used by subsidiary 150 to facilitate transactions.

In an exemplary embodiment, the system of the present invention enables parent 110 to provide one or more subsidiary account 132, each being related to the parent account 115. In other words, subsidiary card account 132 may comprise one or more accounts that may each be linked to the parent account 115. Similarly, subsidiary 150 may comprise a corresponding number of subsidiaries, each being the beneficiary of one or more subsidiary card account 132. Accordingly, the system of the present invention may enable a corporation to provide for many employees and similarly may enable a guardian to provide for many dependents.

In an exemplary embodiment, the flexible limit subsidiary card account system 100 is implemented as computer software modules loaded onto the computer of parent 110, the computer of administrator 130, the computer of subsidiary 150, and/or the computer of a merchant 170. In an exemplary embodiment, the computer of parent 110, the computer of subsidiary 150, and the computer of merchant 170 do not require any additional software (beyond what is required to accomplish traditional on-line transactions) to participate in the online transactions supported by the flexible limit subsidiary card account system 100. The additional facilitating software is implemented on the computer of administrator 130.

The system 100 may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including data regarding the parent account 115, subsidiary 150 data, merchant 170 data, financial institution data and/or like data that could be used in association with the present invention. As those skilled in the art will appreciate, the computer of parent 110 and subsidiary computer will typically include an operating system (e.g., Windows NT, 95/98/2000, Linux, Solaris, etc.) as well as various conventional support software and drivers typically associated with computers. The invention, however, could also be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention may be implemented with TCP/IP communications protocols, it will be readily understood that the invention could also be implemented using IPX, Appletalk, IP-6, NetBIOS, OSI or any number of existing or future protocols. The system contemplates the use, sale or distribution of any goods, services or information over any network having similar functionality described herein. Computers can be in a home or business environment with access to a network. In an exemplary embodiment, access is through the Internet through a commercially-available web-browser software package.

Database may be any type of database, such as relational, hierarchical, object-oriented, and/or the like. Common database products that may be used to implement the databases include DB2 by IBM™ (White Plains, N.Y.), any of the database products available from ORACLE CORPORATION™ (Redwood Shores, Calif.), MICROSOFT ACCESS™ by MICROSOFT CORPORATION™ (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Communication between the parties and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The computing units may be connected with each other via a data communication network. The network may be a public network and assumed to be insecure and open to eavesdroppers. For example, the network may be embodied as the internet. In this context, the computers may or may not be connected to the internet at all times. For instance, the computer of the parent 110 and/or the computer of subsidiary 150 may employ a modem to occasionally connect to the internet, whereas administrator 130 or bank computing center might maintain a permanent connection to the internet. Specific information related to the protocols, standards, and application software utilized in connection with the Internet may not be discussed herein. For further information regarding such details, see, for example, Dilip Naik, Internet Standards and Protocols (1998); Java 2 Complete, various authors, (Sybex 1999); Deborah Ray and Eric Ray, Mastering HTML 4.0 (1997). Loshin, TCP/IP Clearly Explained (1997). All of these texts are hereby incorporated by reference.

As a further example, the computer of parent 110, the computer of subsidiary 150, the computer of administrator 130, and the computer of merchant 170 may all be interconnected via a network, referred to as a transaction network. The transaction network represents existing proprietary networks that presently accommodate on-line transactions for credit cards, debit cards, and other types of financial/banking cards. The payment network is a closed network that is assumed to be secure from eavesdroppers. Examples of the payment network include the AMERICAN EXPRESS™, VISANET™ and the VERIPHONE™ network.

One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., PALM PILOT™), cellular phone and/or the like.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant 170 system might also reside within a local area network (LAN) which interfaces to network via a leased line (T1, D3, etc.). Such communication methods are well known in the art, and are covered in a variety of standard texts. See, e.g., Gilbert Held, Understanding Data Communications (1996), hereby incorporated by reference.

In on-line implementations of the instant invention, each participant is equipped with a computing system Parent 110 may be equipped with a computing unit in the form of a personal computer, although other types of computing units may be used including laptops, notebooks, hand held computers, set-top boxes, and the like. Administrator 130 may be equipped with a computing unit such as a computer-server, although other implementations are possible. Subsidiary 150 and merchant 170 each may be implemented as a computer, which may be a main frame computer or which may be implemented in other forms, such as minicomputers, PC servers, a network set of computers, and the like.

The computer may provide a suitable website or other Internet-based graphical user interface which is accessible by users. In one embodiment, the Internet Information Server, MICROSOFT™ Transaction Server, and MICROSOFT™ SQL Server, are used in conjunction with the MICROSOFT™ operating system, MICROSOFT™ NT web server software, a MICROSOFT™ SQL database system, and a MICROSOFT™ Commerce Server. Additionally, components such as Access Sequel Server, ORACLE™, MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

In an exemplary embodiment, the system of the present invention facilitates administration of a subsidiary card account 132 so that it may function with many of the features and characteristics of traditional credit cards. For example, subsidiary card account 132 may be configured to be used at an ATM or at a point of sale and can also be configured to provide security and protection through traditional insurance features. Moreover, subsidiary card account 132 may be configured to satisfy most if not all standard credit card requirements such as embossing of the identifying information (e.g., name, account number, expiration date, signature, and the like) of parent 110 and subsidiary 150.

In addition, the flexible limit subsidiary card account system can accommodate the requirements of the underlying dependent financial instruments. If there are usage restrictions or limitations in place for the parent account 115, those same controls (if known) may be enforced by flexible limit subsidiary card account 132. For example, if subsidiary card account 132 is to be restricted to use at only restricted merchants 170, then the system will disable subsidiary card account 132 from being used at any non-approved merchant 170.

Similarly, a subsidiary card account may be configured to accommodate emergency conditions such as an emergency needs for medical care, pharmaceuticals, transportation, or the like. Accordingly, subsidiary card account may be configured to bear an extended spending capacity available for use at specific merchants (e.g., a specified hospital, pharmacy, or travel agent) or specified classes of merchants (e.g., medical service providers, pharmacies, or travel agencies in general).

Administrator 130 is configured to facilitate determination and adjustment of appropriate spending powers for the parent account 115 and subsidiary card account 132 in accordance with a predetermined set of rules. An exemplary set of rules configured to accommodate the provision of a credit line to a subsidiary 150 may require anallocation of risk between administrator 130 and parent 110 whereby the spending power of the parent account 115 is reduced by an amount that is less than the spending capacity or credit line established for related subsidiary card account 132, in accordance with, and reflecting, an allocation of risk accepted by administrator 130. Similarly, the system 100 may include a similar set of rules and be configured to accommodate a reduction in an existing spending capacity that previously had been provided to a subsidiary 150. For example, the spending power of the parent account 115 may be increased by an amount that is less than the reduction in the spending capacity for the related subsidiary card account 132.

As discussed herein, an administrator 130 may issue a subsidiary card account 132 that bears its own spending capacity, i.e., a subsidiary spending capacity, and that is linked to a parent account 115. As described herein, the system of the present invention enables parent 110 to define and change the spending capacities (e.g., credit limits or other mechanisms for approving or denying an individual transaction) for each subsidiary card account 132 or to cancel one or more subsidiary card account 132 altogether. To accommodate the access of subsidiary card account 132 to the subsidiary spending capacity, the original spending power of a parent account 115 is reduced to a modified parent spending power. The difference between the original parent spending power and the modified parent spending power, however, may be less than the subsidiary spending capacity in cases where some of the risk associated with subsidiary card account 132 is assumed by administrator 130. In other words, the sum of the modified parent spending power and the subsidiary spending capacity may be greater than the original parent spending power, the difference being equal to the risk assumed by administrator 130. For example, an original spending power of a parent account 115 set at $9500 may be reduced to $9000 when an administrator 130 issues a subsidiary card account 132 linked to the parent account 115, but the subsidiary card account 132 will have a spending capacity of $1000. In this case, the original spending power of the parent account 115 is decreased by $500 while administrator 130 assumes $500 of risk. Thus, the total spending power for the parent account 115 and the subsidiary card account 132 increases from $9500 to $10000.

An exemplary administrator 130 is further configured to establish more than one subsidiary card account 132 at the request of parent 110, and each subsidiary card account 132 may bear a different credit line than either the parent account 115 or any other subsidiary card account 132. In addition, an exemplary administrator may receive, and facilitate execution of, a request from parent 110 to define, modify, and/or terminate the spending capacity and/or debt accumulation limit for subsidiary card account 132 (e.g., $500.00 spending capacity for a first subsidiary card account 132, $800.00 spending capacity for a second subsidiary card account 132, and $250.00 spending capacity for a third subsidiary card account 132) and/or modified by parent 110.

In accordance with an exemplary embodiment, the system may also be configured to prevent carry-over of credit from one month to the next. In accordance with this embodiment, transactions facilitated by subsidiary card account 132 are permitted until a pre-set spending capacity has been consumed. For example, in an exemplary embodiment, administrator 130 tracks the transactions facilitated by the subsidiary card account 132 to maintain a current account status. Whenever authorization for a particular transaction is requested of the administrator 130, the administrator 130 compares the status that would exist if the transaction were authorized and completed against the permissible status based upon a predetermined set of criteria (e.g., credit line, spending limit, payment status, creditworthiness). Thus, when the transactions facilitated by a subsidiary card account 132 have reached the spending capacity, or would cause the spending capacity to be exceeded within the predetermined time period, or otherwise violate the predetermined set of criteria, no more charges will be authorized. In accordance with this embodiment, at each cycle cut, available credit is re-set to the pre-defined spending capacity. Thus, in accordance with this embodiment, unused spending capacity from one cycle cannot be used during the following cycle. In the event that the card is configured to accommodate emergency transactions as described herein, however, emergency transactions may be permitted without consuming spending capacity.

Alternatively, the system may be configured to permit carry-over and accumulation of spending capacity from one month to the next. In this embodiment, at the beginning of each cycle cut, additional spending capacity may be added to subsidiary card account 132. In accordance with this embodiment, unused spending capacity from one cycle can be used in subsequent cycles and may be accumulated. In the event that carry over capacity is permitted, the carry over risk is allocated between the parent 110 and the administrator 130 in accordance with a predetermined set of criteria as described above.

With respect to applications and account settling, administrator 130 may require both parent 110 and prospective subsidiary 150 to apply for the subsidiary card account 132. Administrator 130 may require information regarding parent 110 to assess qualification for the subsidiary card account 132 (credit history, salary, etc.). Administrator 130 may also require information regarding subsidiary 150 to qualify for a minimum age requirement, to provide information to be embossed on the card, and to provide identification information (e.g., social security number, mother's maiden name, etc.). In addition, administrator 130 may define a maximum pre-set spending capacity, limit, or budget based upon an assessment of the parent's 110 creditworthiness, and subject to a predetermined maximum amount.

It should be noted that the system 100 may at times require acquisition or verification of the identity of parent 110 or subsidiary 150. Administrator 130 may accomplish the process of obtaining and/or verifying the identity of parent 110 or subsidiary 150 through a variety of means that are known in the art including, but not limited to, use of private databases, credit bureau databases, transmission of biometric data, transmission of "hand-shake" data (i.e., smart card signature, challenge/response, etc) and/or the like. Examples of online authentication are disclosed in U.S. Ser. No. 09/962,490 "Microchip-Enabled Online Transaction System", filed Sep. 12, 2001, with inventors Anant Nambiar and Geoffrey Stern, which is hereby incorporated by reference. Thus, the authentication information is collected for the purpose of establishing the subsidiary card account 132 and defining its ownership. It should be noted that, although the instant invention may be embodied as a microchip enabled device, it may also be configured as a virtual and not a physical (e.g., plastic) account, which may not accommodate a microchip.

In accordance with the present invention, an exemplary system is configured to facilitate communication between parent 110, a subsidiary 150, and an administrator 130 regarding the status (e.g., transactions, accrued interest, balances, available credit, payments, billings, etc.) of subsidiary account 132 and a parent account 115. In accordance with an exemplary embodiment, administrator 130 may communicate statements or transaction reports to both parent 110 and subsidiary 150. Accordingly, subsidiary 150 may monitor transactions and dispute charges if necessary. In addition, administrator 130 may enable parent 110 to monitor the amount of spending capacity consumed by subsidiary 150. As discussed herein, the levels of detail provided in such statements 134 may be configured by parent 110, subsidiary 150, or both. Further, whenever parent 110 has modified the spending capacity of subsidiary card account 132, administrator 130 may be configured to notify subsidiary 150 through subsidiary statement 136. Based upon the parent statement 134, parent 110 may remit payment 114 to administrator 130, or a designee of administrator 130.

Accordingly, an exemplary administrator 130 is configured to generate a parent account statement 134 for the parent account 115. In addition, administrator 130 is configured to dispatch additional statements 136 for each subsidiary card account 132 to each designated subsidiary 150. The subsidiary account statements 136 may be dispatched to individual designated addresses such as the separate addresses of the individual subsidiaries 150. Moreover, administrator 130 is configured to charge, i.e., adjust, the parent account 115 spending power based on the spending capacity advanced to and consumed by each of the subsidiaries 150. In an exemplary embodiment, the statement 134 provided to parent 110 regarding the activity of each subsidiary 150 is limited to the aggregate sum owed. Alternatively, the statements 134 may include additional information regarding the activities of each subsidiary 150 may be provided depending upon the wishes of parent 110 and/or each subsidiary 150. Administrator 130 may provide various levels of control to parent 110 and/or various levels of independence and privacy to subsidiary 150 through this mechanism. Finally, administrator 130 is configured to manage and track the balances of each parent account 115 and each subsidiary card account 132 in accordance with the activities transacted using each account (e.g., purchases, cash advances, interest accrued, payments made, credit limits modified, spending capacities, etc.).

Figure 3:
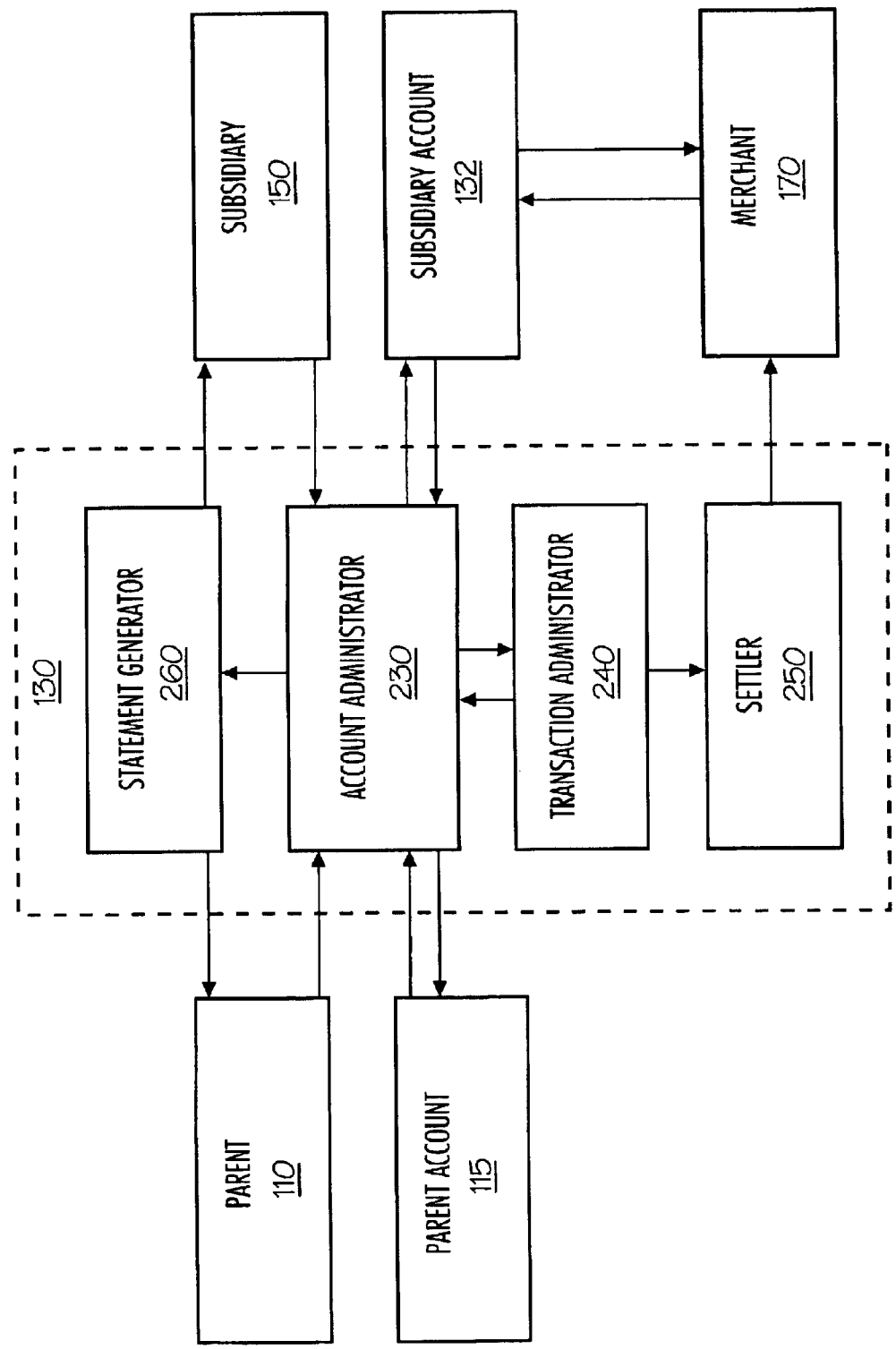
FIG. 3 illustrates an exemplary process for administering a flexible limit subsidiary card account.

FIG. 3 illustrates an exemplary administrator 130 configured to administer a flexible limit subsidiary card account 132. In accordance with this embodiment, administrator 130 is configured to facilitate communication between parent 110, a subsidiary 150, and a merchant 170 regarding the status (e.g., transactions, accrued interest, balances, available credit, payments, billings, etc.) of subsidiary account 132 and a parent account 115. In accordance with this embodiment, administrator 130 comprises an account administrator 230, a transaction administrator 240, a settler 250, and a statement generator 260.

In an exemplary embodiment, account administrator 230 is configured to receive a request from parent 110 and to facilitate the establishment, issuance and administration of one or more subsidiary card account 132 so that it may be used by the subsidiary 150 to facilitate transactions. In addition, account administrator 230 is configured to facilitate determination and adjustment of appropriate spending powers for the parent account 115 and the subsidiary card account 132 in accordance with a predetermined set of rules. Accordingly, account administrator 230 is configured to receive and facilitate execution of a request from a parent 110 to define, modify, and/or terminate the spending and/or debt accumulation limits for the subsidiary card account 132 and to charge, i.e., adjust, the parent account 115 spending power based on the credit advanced to and consumed by each of the subsidiaries 150. Further, account administrator 230 is configured to manage and track the balances of each parent account 115 and each subsidiary card account 132 in accordance with the activities transacted using each account (e.g., purchases, cash advances, interest accrued, payments made, credit limits modified, spending capacities, etc.). In the event parent 110 fails to remit payment as promised, account administrator 230 is configured to place a hold on subsidiary card account 132.

In an exemplary embodiment, transaction administrator 240 is configured to facilitate transactions until a pre-set spending capacity has been consumed Accordingly, transaction administrator 240 is configured to limit total spending. In addition, transaction administrator 240 may be configured to limit spending for specific classes of goods and/or services, to limit spending at specific classes of merchants or service providers, or to limit spending at specifically identified merchants or service providers. Moreover, where specific restrictions exist to condition the use of the parent account 115, the transaction administrator may be configured to enforce those restrictions against any associated subsidiary card account 132. Finally, transaction administrator 240 may be configured to accommodate emergency transactions in accordance with predefined criteria, e.g., specific medical service providers or pharmacies.

In an exemplary embodiment, settler 250 is configured to provide a settling payment to merchant 170 via settlement 138. In addition, settler 250 is configured to arbitrate disputed transactions associated with subsidiary card account 132 directly with subsidiary 150 and merchant 170.

In an exemplary embodiment, statement generator 260 is configured to generate a parent account statement 134 for the parent account 115 and to dispatch additional statements 136 for each subsidiary card account 132 to each designated subsidiary 150.

It should be noted that the system of the instant invention may also incorporate features to facilitate additional security benefits. While these features may take many forms that may be appreciated by one of ordinary skill in the art, an exemplary system includes a card replacer that may be activated to replace a parent card or a subsidiary card. In addition, a customer service engine may be configured to receive a message from a parent or a subsidiary through any means known in the art, such as a telephone call or an e-mail message or another message transmitted, for example, through the internet. Customer service engine may also be configured to verify the identity of the message sender, e.g., a parent or a subsidiary, to verify the authority of the message sender to request a service, i.e., emergency card replacement, and to determine the appropriate responsive action, such as requesting that the card replacer send the requester a replacement card. As a result, additional security benefits are realized by the consumer.

Figure 2:
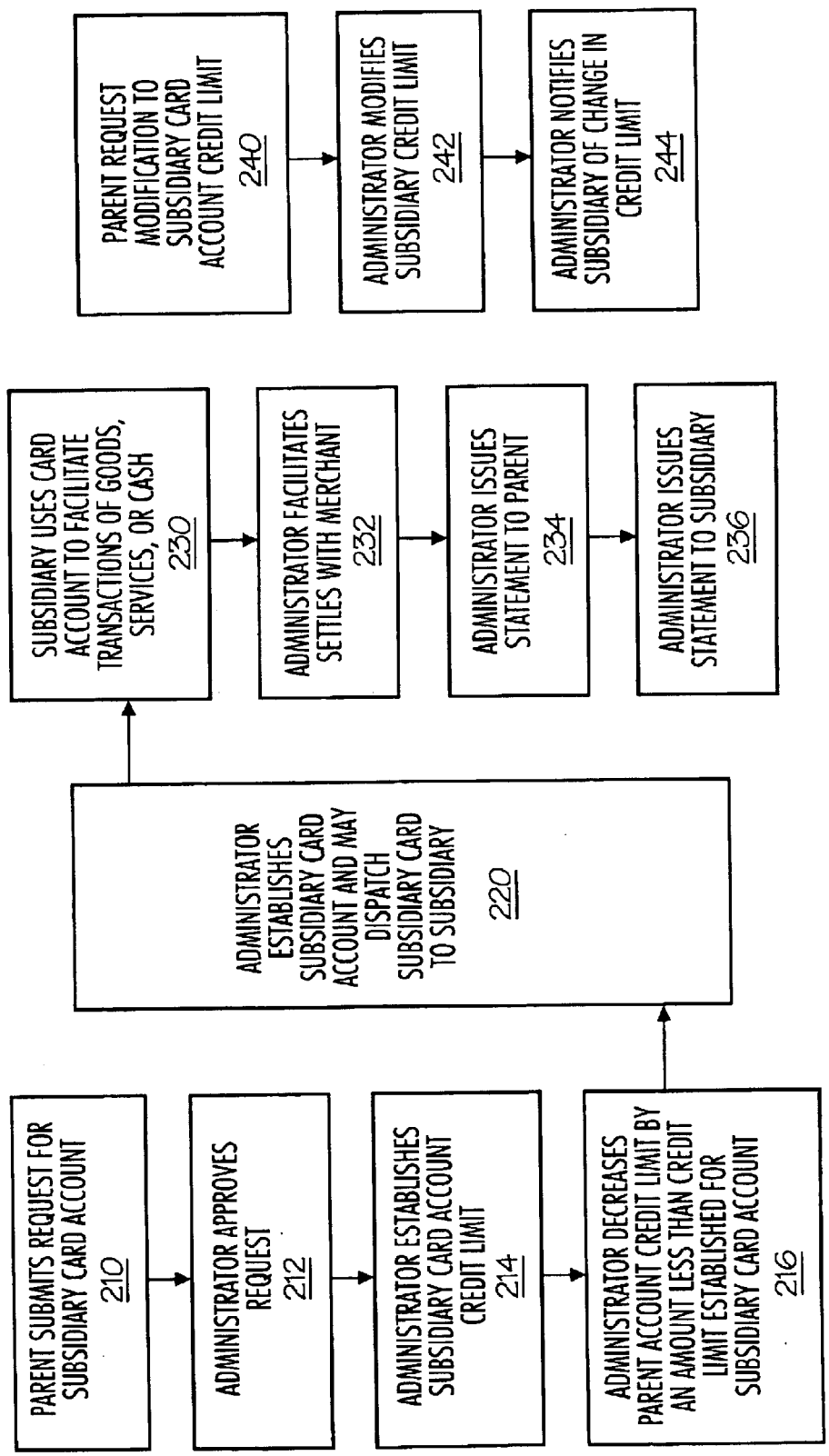
FIG. 2 illustrates an exemplary administrator configured to administer a flexible limit subsidiary card account.

FIG. 2 illustrates an exemplary process for administering a flexible limit subsidiary card account 132. In accordance with this embodiment, a parent 110 submits a request 112, via facsimile, telephone, internet or any other means known in the art, for a subsidiary card account 132 to an agent, delegate, or affiliate of the administrator (step 210). The request 112 may include information sufficient to identify and verify the identity of the parent 110 and the subsidiary 150 (e.g., name, address, social security number, mother's maiden name, telephone number). The request 112 may also include information necessary to configure a subsidiary card account 132 such as desired spending capacity, credit line, restricted merchants 170 or classes of merchants, emergency enabled merchants or classes of merchants for whom the spending capacity may be extended or waived, and whether carryover is enabled. In response, administrator 130 may approve or refuse the request based upon a predetermined set of criteria such as credit worthiness or payment history of the parent 110 (step 212). If administrator 130 approves the request 112, administrator 130 establishes subsidiary card account 132 and a subsidiary spending capacity (step 214). The subsidiary card account 132 and the parent account 115 are linked in that the parent account 115 remains responsible for transactions facilitated by the subsidiary card account 132 and in that the parent 110 may access account and transaction information related to the subsidiary card account 132. To accommodate the provision of credit to subsidiary 150, administrator 130 decreases the spending power of the parent account 115 in accordance with a predetermined set of rules, for example, by an amount less than the amount of credit provided to subsidiary 150 (step 216). Accordingly, a dministrator 130 accepts some risk for the extension of credit to subsidiary 150. In the event of non-payment for transactions facilitated by the subsidiary card account, a hold may be placed upon both the parent account 115 and the subsidiary card account 132. Ultimately, the parent 110 is responsible for all transactions facilitated by the subsidiary card account. Finally, administrator 130 dispatches tangible indicia of subsidiary card account 132, such as a plastic card, to subsidiary 150 (step 220).

If approved, the system issues a card to subsidiary 150 as well as a PIN number or other means for verifying the identity of, i.e., authenticating, the user at, for example, an ATM. Upon receipt of the card, before use, the system may require the card member to activate subsidiary card account 132 (e.g., sign the card and/or place a telephone call to a predetermined number). Once subsidiary card account 132 has been activated, subsidiary 150 may use the card account 132 throughout the cycle period to facilitate on-line and off-line transactions at permissible merchants 170 or to conduct withdrawals of cash at ATMs until the pre-set spending capacity has been reached.

Upon establishment of the subsidiary card account 132, subsidiary 150 may use the subsidiary card account 132 to facilitate purchases of goods and/or services 172 or may access ATMs for cash (step 230) using known in the art systems and methods. After subsidiary 150 uses the subsidiary card account 132, administrator 130 provides a settling payment via settlement 138 to merchant 170 using any appropriate settlement procedures known in the art (step 232). In addition, administrator 130 prepares and issues a statement to parent 110 reflecting the activity of subsidiary 150 using the subsidiary card account 132 (step 234). In an exemplary embodiment, a typical statement generator and printer are utilized to produce a consolidated statement containing account and transaction data for both the parent account 115 and the subsidiary card account 132. Finally, administrator 130 prepares and issues a statement to subsidiary 150 reflecting the activity on the subsidiary card account 132 for that cycle (step 236).

In the beginning of cycle, the parent account 115 is debited with the monthly budget allocated to the subsidiary card account 132, and the subsidiary card account 132 is credited with a corresponding value. Card account 132 usage is then permitted during the cycle up to the spending capacity to facilitate subsidiary transactions such as spending at a merchant 170 or a withdrawal of cash at an ATM.

At the end of the cycle, the issuer provides a statement to parent 110. The statement includes the spending capacity (a.k.a. budget) that was allocated to subsidiary 150 at the beginning of the cycle. Changes to the spending capacity are accomplished where, first, parent 110 desired to effect a change, second, communicates a request to the issuer (e.g., via telephone or on-line), third, the issuer approves the request, and fourth, implements the change.

At cycle cut, the system provides a billing statement reflecting the charges made by subsidiary 150 to parent 110, either in a consolidated form with the statement for the parent account 115 or as a stand alone statement. Also, the system updates the spending capacity in accordance with the agreement with parent 110 (e.g., reflecting carry-over designations, charges made, payments made, interest accrued, adjustments to the spending capacity, and the like).

Once one or more subsidiary card account 132 has been established, the charges for each subsidiary card account 132 may be billed, for example, on a periodic (e.g., monthly) basis to, for example, the parent account 115 or a company's account or a predetermined bank account for direct payment. Parent 110 may pay the charges on the subsidiary card account 132 on a periodic (e.g., monthly) basis through any available funding vehicle (e.g., credit card, debit card, bank account, cash) or any combination thereof The system may also be configured to allow parent 110 to modify the spending capacities of the subsidiary card account 132 or to cancel subsidiary card account 132 altogether. In the event that parent 110 wishes to modify the spending capacity of subsidiary card account 132, parent 110 may communicate a request to administrator 130 via facsimile, internet, telephone or other method known in the art (step 240). Once administrator 130 has received the request, administrator 130 may then modify the spending capacity of subsidiary card account 132 in accordance with a predetermined allocation of risk (step 242), and may notify subsidiary 150 of the modification (step 244) by facsimile, telephone, internet, e-mail, courier, standard mail or other means known in the art.

In addition, the system is configured to enable parent 110 to modify the pre-set spending capacity upon the request of parent 110. In situations where parent 110 would like to change spending limits, or cancel card account 132, parent 110 communicates the request to the administrator via telephone call to a predefined telephone number or via on-line request. In response, administrator 130 approves the request and accomplishes the modification.

In accordance with an exemplary embodiment, the system facilitates the application and card account 132 establishment process. The system also tracks card account 132 usage and payments, and tracks the outstanding balance relative to the pre-set spending capacity. In accordance with this embodiment, the application and card account 132 establishment process begins when parent 110 and a potential subsidiary apply for a card account 132 by transmitting application information to an administrator. The application information may include information identifying parent 110 (e.g., personal details regarding parent 110, account number of parent account 115), information identifying subsidiary 150 (e.g., personal details regarding subsidiary 150), information defining the desired characteristics of the subsidiary card account 132 (e.g., desired spending capacity, allowable carry-over from cycle to cycle, limited or forbidden merchants 170, and the like), and acceptance of terms (e.g., agreement of responsibility).

In the event that parent 110 elects to cancel the parent account 115, administrator 130 will also cancel any subsidiary account 132 linked to the cancelled account, unless parent 110 provides another form of security for the subsidiary account 132. If the subsidiary account 132 has a positive balance at the time it is cancelled, administrator 130 will refund the positive balance to parent 110. Administrator 130 is also configured to accommodate disputed transactions associated with subsidiary card account 132 directly with subsidiary 150. In the event parent 110 fails to remit payment to administrator 130 as promised, administrator 130 is configured to place a hold on account 132.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography, please review a text written by Bruce Schneier, which is entitled "Applied Cryptography: Protocols, Algorithms, And Source Code In C," published by John Wiley & Sons (second edition, 1996), which is hereby incorporated by reference.

Other systems that may be integrated with, or layered on, the present invention include, for example, other loyalty systems, transaction systems, electronic commerce systems and digital wallet systems such as, for example, the Shop AMEX™ system as disclosed in Ser. No. 60/230,190 filed Sep. 5, 2000; the MR as Currency™ and Loyalty Rewards Systems disclosed in Ser. No. 09/834,478 filed on Apr. 13, 2001; a Digital Wallet System disclosed in U.S. Ser. No. 09/652,899 filed Aug. 31, 2000; a Stored Value Card as disclosed in Ser. No. 09/241,188 filed on Feb. 1, 1999; a System for Facilitating Transactions Using Secondary Transaction Numbers disclosed in Ser. No. 09/800,461 filed on Mar. 7, 2001; Methods and Apparatus for Conducting Electronic Transactions disclosed in Ser. No. 60/232,040 filed Sep. 12, 2000, all of which are hereby incorporated by reference. Other examples of online reward or incentive systems are disclosed in U.S. Pat. No. 5,774,870, issued on Jun. 30, 1998, and U.S. Pat. No. 6,009,412, issued on Dec. 29, 1999, both of which are hereby incorporated by reference. Additional information relating to smart card and smart card reader payment technology is disclosed in Ser. No. 60/232,040, filed on Sep. 12, 2000, and U.S. Pat. Nos. 5,742,845; 5,898,838 and 5,905,908, owned by Datascape; which are hereby incorporated by reference. Moreover, additional information related to online privacy and anonymity systems may be found at www.PRIVADA.COM, which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, an integrated circuit, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A method for facilitating the administration of a subsidiary credit card account comprising the steps of:
   receiving a request from a parent for a subsidiary card account, said parent identifying a parent account, said parent account being a financial account controlled by the parent, the parent account having a parent spending power;
   establishing a subsidiary card account having a subsidiary spending capacity; and
   reducing said parent spending power by an amount less than said subsidiary spending capacity.

2. The method of claim 1 further comprising the step of modifying said subsidiary spending capacity in response to a request from said parent.

3. The method of claim 2, further comprising the step of modifying said parent spending power based on a modification of the subsidiary spending capacity.

4. The method of claim 1, further comprising the step of determining a parent spending power for the parent card account and a subsidiary spending capacity for the subsidiary card account in accordance with a predetermined set of rules.

5. The method of claim 1, further comprising the step of tracking the spending of a subsidiary card account.

6. The method of claim 1, further comprising the step of limiting total spending facilitated by a subsidiary card account.

7. The method of claim 1, further comprising the step of limiting spending for a specific class of goods or services facilitated by a subsidiary card account.

8. The method of claim 1, further comprising the step of limiting spending at a specific class of merchants facilitated by a subsidiary card account.

9. The method of claim 1, further comprising the step of limiting spending at a specific merchant facilitated by a subsidiary card account.

10. The method of claim 1, further comprising the step of enforcing specific restrictions against a subsidiary card account, wherein the specific restrictions exist to condition the use of the parent account.

11. The method of claim 1, further comprising the step of accommodating an emergency transaction.

12. The method of claim 1, further comprising the step of generating a statement for a subsidiary card account.

13. The method of claim 1, further comprising the step of generating a statement for a parent account.

14. The method of claim 1, further comprising the step of terminating said subsidiary card account in response to a request from said parent.

15. The method of claim 1, wherein said subsidiary card account is configured to carry-over spending capacity from one cycle to the next.

16. The method of claim 1, wherein said subsidiary card account is configured to prevent carry-over of spending capacity from one cycle to the next.

17. A method for providing a plurality of subsidiary card accounts comprising the steps of:
   receiving a request from a parent for a plurality of subsidiary card accounts, each of said subsidiary card accounts having a subsidiary spending capacity, said parent identifying a financial account controlled by a parent, the financial account having a parent spending power; and
   reducing said parent spending power by an amount less than the sum of said subsidiary spending capacities of each of said subsidiary card accounts.

18. A system for administering a subsidiary card account having a subsidiary spending capacity, the system comprising an account administrator in communication with a transaction administrator, a settler, and a statement generator, the account administrator configured to receive a request from a parent having a parent account and to facilitate the establishment of one or more subsidiary card account by reducing said parent spending power by an amount less than said subsidiary spending capacity, the transaction administrator configured to facilitate transactions consuming said subsidiary spending capacity, the settler configured to facilitate providing a settling payment to a merchant, the statement generator configured to facilitate generating a parent account statement.

19. The system of claim 18, wherein the account administrator is configured to facilitate adjustment of a parent spending power of said parent account and a subsidiary spending capacity of said subsidiary card account in accordance with a predetermined set of rules.

20. The system of claim 19, the predetermined set of rules configured to require an allocation of risk between the administrator and the parent, whereby said parent spending power account is reduced by an amount less than said subsidiary spending capacity.

21. The system of claim 18, wherein the account administrator is configured to facilitate execution of a request from a parent to modify said subsidiary spending capacity.

22. The system of claim 21, wherein the account administrator is further configured to facilitate modification of said parent spending power based on said subsidiary spending capacity.

23. The system of claim 18, wherein the account administrator is further configured to track the spending of a parent account and a subsidiary card account.

24. The system of claim 18, wherein the account administrator is further configured to place a hold on subsidiary card account if parent fails to remit payment as promised.

25. The system of claim 18, wherein the transaction administrator is configured to limit total spending facilitated by the subsidiary card account based on said subsidiary spending capacity.

26. The system of claim 18, wherein the transaction administrator is configured to limit spending for a specific class of goods or services.

27. The system of claim 18, wherein the transaction administrator is configured to limit spending at specific classes of merchants or service providers.

28. The system of claim 18, wherein the transaction administrator is configured to limit spending at specifically identified merchants or service providers.

29. The system of claim 18, wherein the transaction administrator is configured to enforce specific restrictions against a subsidiary card account, wherein the specific restrictions exist to condition the use of the parent account.

30. The system of claim 18, wherein the transaction administrator is configured to accommodate emergency transactions.

31. The system of claim 18, wherein the statement generator is configured to generate and dispatch a statement for each subsidiary card account.

32. The system of claim 18, wherein the settler is configured to arbitrate disputed transactions associated with subsidiary card account.

* * * * *